United States Patent [19]
Nehmey

[11] 4,015,926
[45] Apr. 5, 1977

[54] MULTIPLE STRAND DIE HEAD

[75] Inventor: Sam Donald Nehmey, Lorain, Ohio

[73] Assignee: The B. F. Goodrich Company, Akron, Ohio

[22] Filed: Jan. 20, 1976

[21] Appl. No.: 650,807

[52] U.S. Cl. .................... 425/464; 425/376 R; 425/382 R

[51] Int. Cl.² .................................. B29F 3/04

[58] Field of Search ............... 264/176 R; 425/461, 425/462, 463, 464, 465, 466, 467, 376, 382, 382.2

[56] References Cited
UNITED STATES PATENTS

| | | | |
|---|---|---|---|
| 2,197,988 | 4/1940 | Tanzi | 425/466 X |
| 3,887,322 | 6/1975 | Johnson et al. | 425/466 |

FOREIGN PATENTS OR APPLICATIONS 1,504,354  9/1969  Germany .................... 425/461

Primary Examiner—Francis S. Husar
Assistant Examiner—Mark Rosenbaum
Attorney, Agent, or Firm—Joseph Januszkiewicz; W. A. Shira, Jr.

[57] ABSTRACT

An extrusion die head for attachment to an extruder wherein the die head has a single inlet bore that is connected to a plurality of outlet orifices via a chamber which spreads out the extrudate which in turn reduces the shape of the extrudate to a thin film via a narrow channel to equalize the pressure. The narrow channel is connected to the plural orifices via tapering passageways to provide an equalization of the flow of the extrudate.

4 Claims, 7 Drawing Figures

MULTIPLE STRAND DIE HEAD

BACKGROUND OF THE INVENTION

In processing heat sensitive thermoplastic materials, it is necessary to provide for a smooth continuous uninterrupted flow to avoid thermal degradation. Extruders are designed to take into account screw, barrels, dies and cooling characteristics, attempting to utilize the best features of each to obtain the greatest efficiency in terms of output rate which may be expressed as pounds per hour. In using high output rate extruders for production, optimum efficiency is not achieved as a practical matter because the shape of the finished product may severely limit the full capacity of the extruder since the cross-sectional shape of the extrudate is small, and accordingly limits the output rate to a fraction of designed output. Further, the heating and cooling means requires considerable manipulation because the machine is running below its designed speed. In order to utilize full capacity of the extruder, adapters have been used which divide the main flow channel into a pair of flow channels which in turn are each divided further into a second pair of channels, thereby utilizing the full capacity of the extruder to its designed output efficiency. In achieving this output, the adapter apparatus introduces heating and cooling problems in the attempt to balance the flow output since the heat profile and viscosity profile is interrupted. Further these adapters require complex individual die heads to balance output.

The present invention provides a novel die head which is simple in construction utilizing the full capacity of the extruder. The die head provides a multistrand profile output that has a balanced output without the use of valves or other mechanical flow control devices, since such control devices only add to the initial cost, upkeep and complexity of controls which results in greater cost per unit output. The present invention simplifies the controls and reduces unit cost. The present invention is particularly useful in producing shapes that require sufficient cooling as in heated PVC. An example of this is where an inside corner molding is to be produced which shape is limited to a linear rate of approximately 25 feet per minute at an output rate of 60 pounds per hours. Utilizing the apparatus of the present invention and running six shapes or outlets at a time, the production rate of 140 to 160 pounds per hour can be achieved while maintaining the same linear rate of between 20 to 30 feet per minute thereby achieving a total of between 120 to 150 feet of product per minute.

SUMMARY OF THE INVENTION

The present invention contemplates an extrusion die head that is adapted to be connected to an extruder to provide a plurality of strands of extrudate. The die head has a single long inlet bore that connects centrally to an elongated chamber that tapers forwardly towards the respective end portions of the chamber to provide an even continuous flow. The laterally tapered chamber also tapers downward in vertical cross section to a thin narrow channel to equalize the pressure. The channel then enlarges and separates into a plurality of separate passageways, terminating into separate outlet orifices.

DETAILED DESCRIPTION

Figure 1:
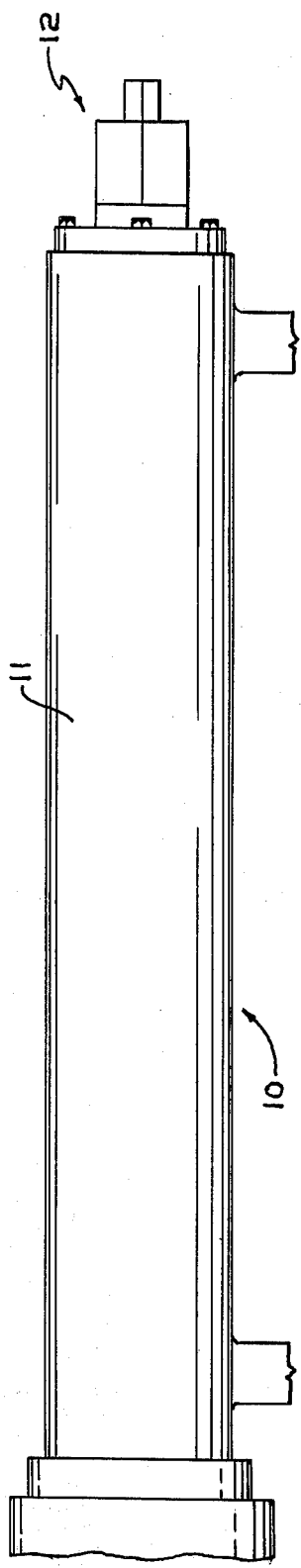
FIG. 1 is a side elevational view of an extruder with an extruder die head on the forward portion thereof.

Referring to the drawings wherein like references characters designate like or corresponding parts throughout the several views, there is shown in FIG. 1 an extruder 10 having an extruder barrel 11 housing a feed screw and at one end thereof a die head 12.

Figure 3:
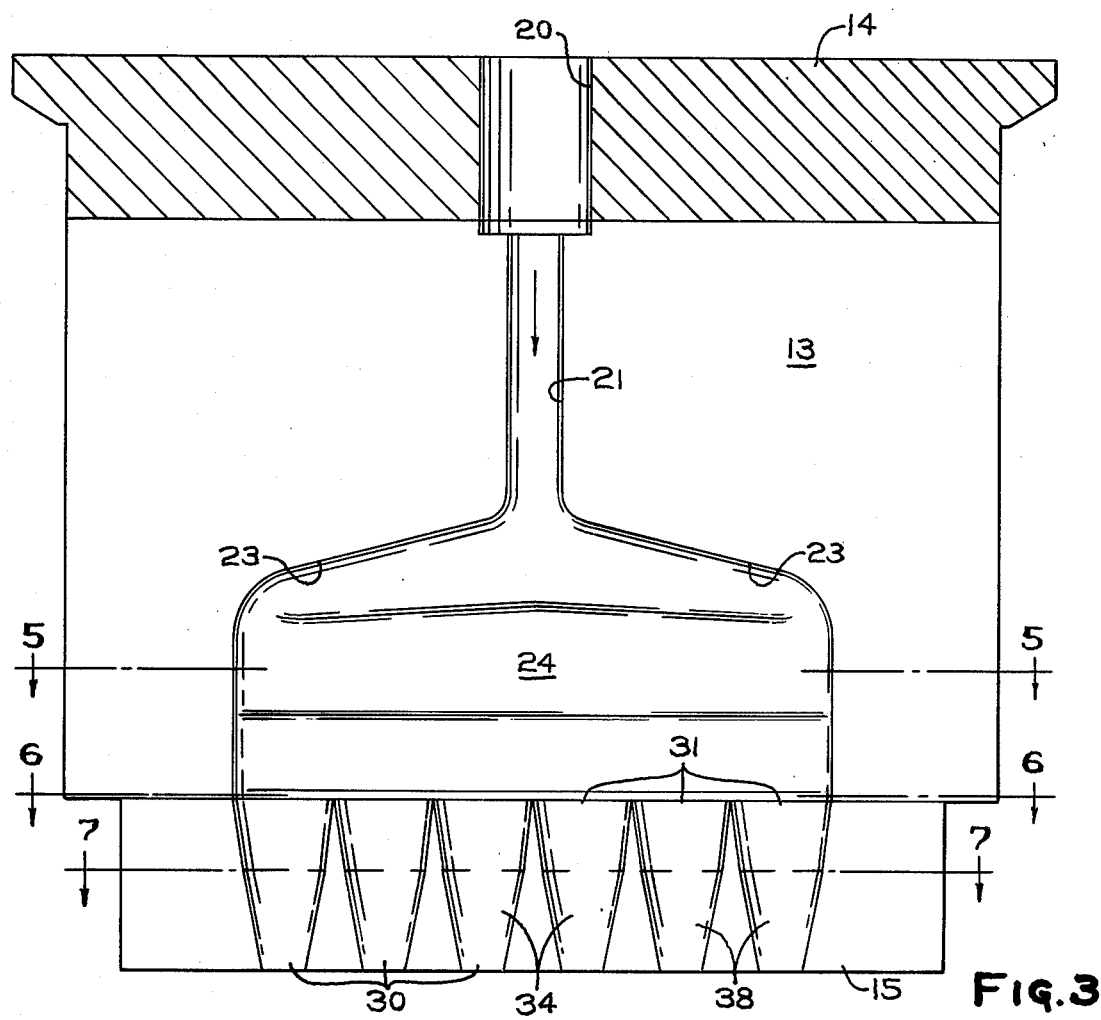
FIG. 3 is an enlarged plan cross-sectional view of the extruder die head.
Figure 4:
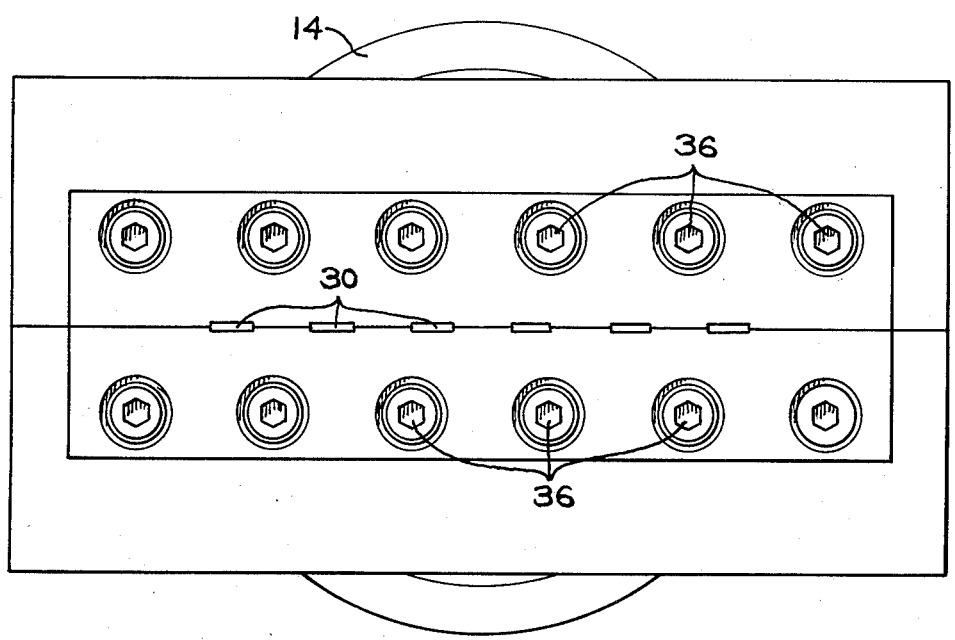
FIG. 4 is a front view of the die head.
Figure 5:
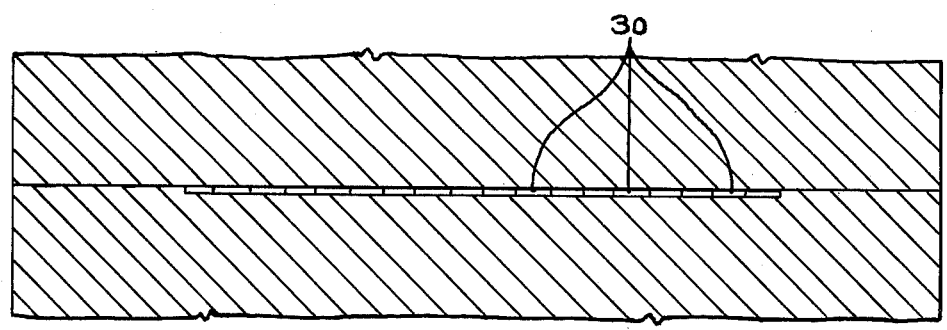
FIG. 5 is a cross-sectional view of the die head taken along line 5—5 of FIG. 3.

Die head has a die body 13, die flange 14 and a die head orifice block 15. Die flange 14 is suitably connected to the output end of the extruder 10 such that the inlet orifice 20 is in alignment with the outlet opening of the extruder. Inlet orifice 20 of flange 14 registers with one end of a bore 21 extending longitudinally into die body 13. The other end of bore 21 communicates with an elongated tear shaped chamber 22. The respective end portions 23 taper inwardly towards the bore 21 as viewed in plan (FIG. 3). The forwardly disposed portion of chamber 22 tapers in vertical dimension into a narrow channel 24 that extends across substantially the full width of die body 13.

Figure 2:
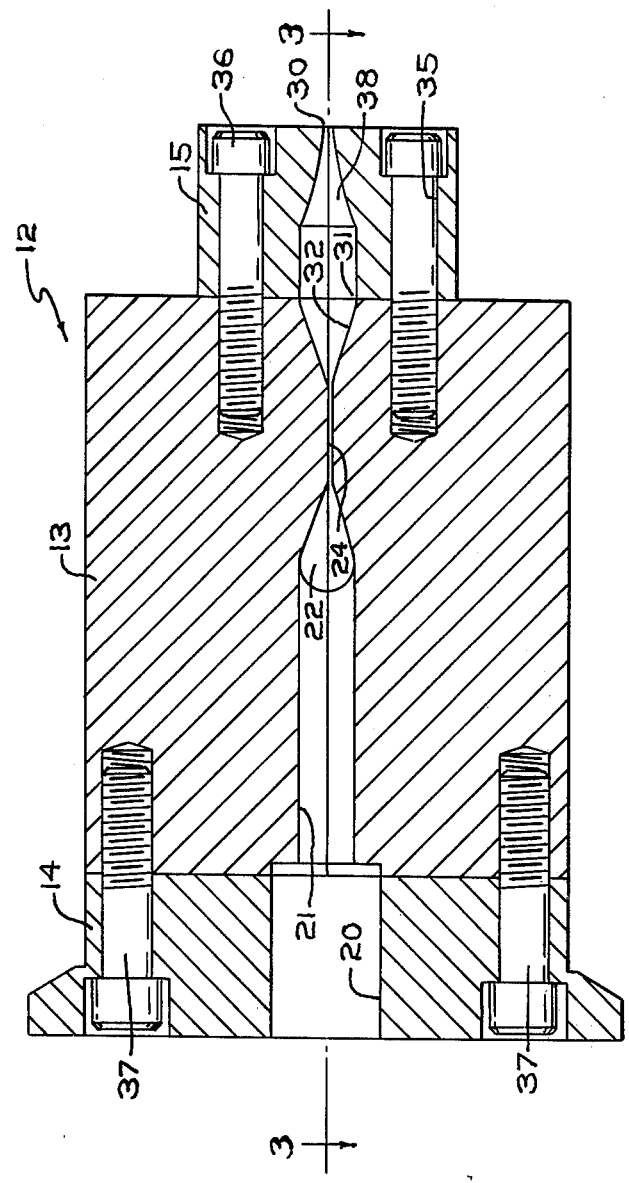
FIG. 2 is an enlarged side elevation cross-sectional view of the extruder die head.
Figure 6:
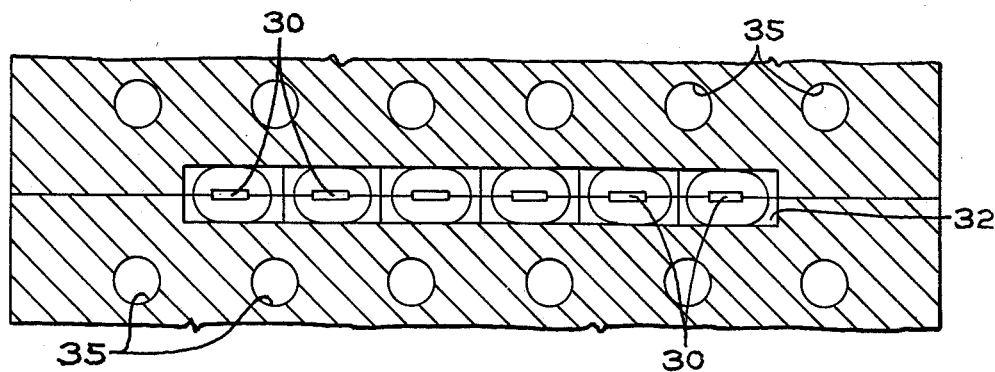
FIG. 6 is a cross-sectional view of the die head taken along line 6—6 of FIG. 3.
Figure 7:
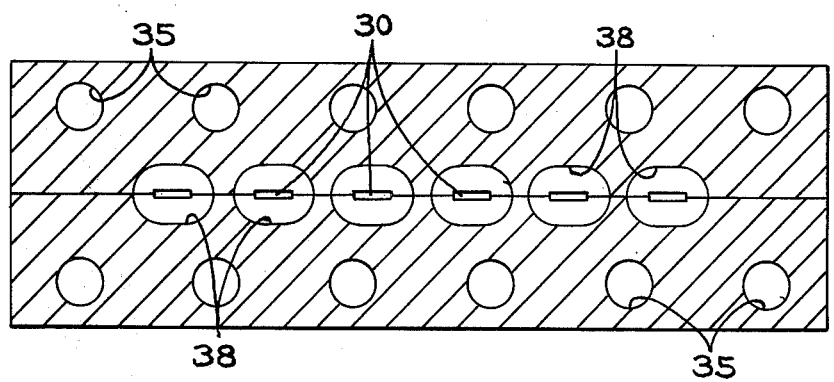

Die head block 15 has a plurality of outlet orifices 30 at the outlet end, which taper outwardly into die head block 15 to form six interconnecting rectangular shaped recesses 31, which recesses 31 merge into one elongated rectangular shaped recess or cavity 32 (FIGS. 2 and 6). Recess 32 tapers downwardly in vertical dimension to join and merge with narrow channel 24. Such recess 32 has a cross-sectional area that is over 5 times greater than the cross-sectional area of the narrow channel 24. Suitable bores 35 are provided in die head block 15 and die body 13 to receive threaded bolts 36 to interconnect the respective block 15 to die body 13. Bolts 37 suitably interconnect die flange 14 to die body 13.

The extrudate from extruder 10 passes through inlet orifice 20 in cylindrical form into bore 21 of die body 13 for passage into chamber 22. Chamber 22 tapers outwardly towards the respective end portions 23 and acts as a reservoir means to spread out the extrudate evenly to eliminate stagnation of the melt. The chamber 22 tapers in height and narrows forwardly into a narrow channel 24 that extends across the width of the die body 13 to equalize the pressure on the extrudate and assures an even unrestricted continuous flow to prevent stagnation and maintain an even temperature on the melt. The extrudate then is divided evenly into a plurality of separate distinct portions for passage through passageways 38 with subsequent channeling through the separate distinct orifice heads 30 for extrusion to the desired shape. Such extrusion issue at a low linear rate but utilizing the full capacity of the extruder.

Various modifications are contemplated and may obviously be resorted to by those skilled in the art without departing from the described invention, as hereinafter defined by the appended claims, as only a preferred embodiment thereof has been disclosed.

I claim:

1. An extrusion die head for use with an extruder, one end of said die head having a longitudinally extending bore extending thereinto for receiving extrudate from an extruder, said die head having an elongated chamber with an opening centrally disposed therein, said opening communicating with said bore, the other end of said die head having a plurality of outlet orifices for directing a plurality of extrudates therefrom, each orifice is connected to a passageway that extends rearwardly from said other end of said die head, said passageways increasing in cross-sectional dimension as said passageway extends further away from said other end, said passageway increases in cross-sectional dimension until they form a single passageway that in interconnected with an elongated recess that extends laterally across the width of said die head, an elongated narrow channel in said die head disposed in alignment with said recess and extending laterally across the width of said die head, said narrow channel interconnecting said recess with said chamber, said chamber extends laterally across the full width of said die head and in alignment with said narrow channel and being of the same width as said channel, and said chamber across the full width of said die head tapers substantially uniformily from said full width to said narrow channel.

2. An extrusion die head having a die body, the rearwardly disposed portion of said die body having a bore therein for receiving an extrudate from an extruder, said die body having an elongated chamber that extends across the full width of said die head, said chamber being centrally connected to said bore, said die head having a narrow slit channel that extends across the full width of said die head, said chamber tapers gradually toward the respective side edge portions thereof, said chamber along the entire width thereof tapers forwardly toward said narrow slit channel, said narrow channel being substantially consistent in cross section for the entire width thereof, said channel merging with a cavity that extends the entire width of said narrow channel, said cavity merging with a plurality of separate passaeways, each of said passageways is similar in cross-sectional dimension, outlet orifices at the forward end of said die head, and said passageways tapering into said outlet orifices to provide a continuous uninterrupted flow of extrudate.

3. An extrusion die head as set forth in claim 1, wherein said cavity has a cross-sectional area that is over five times greater than the cross-sectional area of said channel.

4. An extrusion die head as set forth in claim 3, wherein said cavity cross-sectional area tapers into said passageways, and said passageways taper downwardly in size to merge into said outlet orifices.

* * * * *